Dec. 1, 1959
H. J. B. TOPP
2,915,181
APPARATUS FOR USE IN CLASSIFYING OR BOTH
CLASSIFYING AND DRYING LOOSE MATERIAL
Filed Feb. 10, 1954
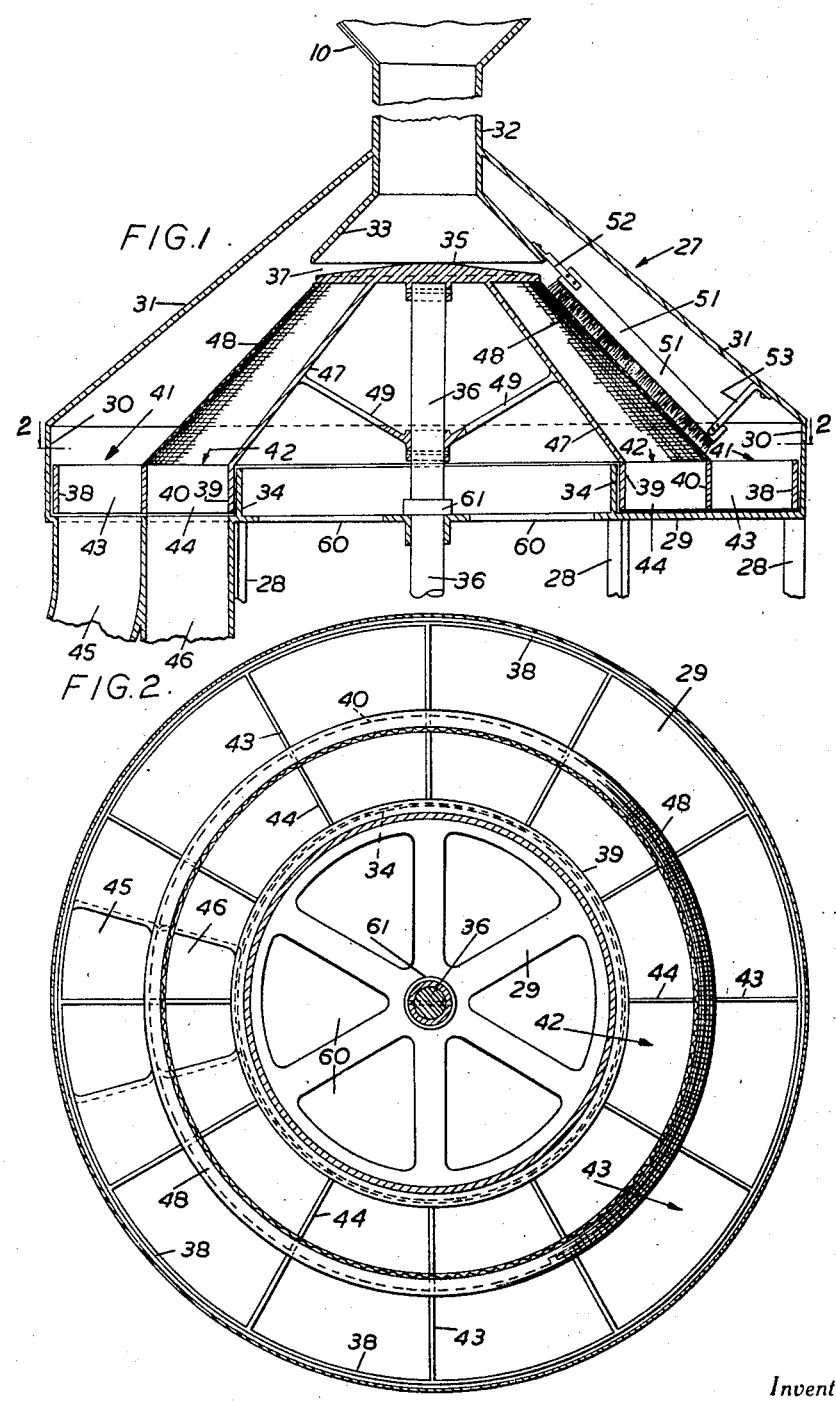
Inventor
Hereward J. B. Topp
By Watson, Cole,
Grindle & Watson
Attorneys

2,915,181

APPARATUS FOR USE IN CLASSIFYING OR BOTH CLASSIFYING AND DRYING LOOSE MATERIAL

Hereward Joseph Betheridge Topp, Waipukurau, New Zealand

Application February 10, 1954, Serial No. 409,449

1 Claim. (Cl. 209—279)

The invention relates to the treatment of loose unequally divided material having sufficient weight to fall by gravity, such as lime, coal, asbestos fibre, meat meal and grain or grain tailings, One of the objects of the invention is to provide apparatus for use in dealing with the problem arising where the loose unequally divided material, either in a dry or a moist state, has to be classified into grades.

Another object of the invention is to provide apparatus by the use of which loose unequally divided material can be classified into grades as a continuous process.

A further object of the invention is to provide apparatus capable of classifying loose unequally divided material into grades, without the necessity for applying reciprocatory or oscillatory movements to any of the parts of the apparatus, thereby avoiding the setting up of vibration resulting from such movements, avoiding complications in the design of the apparatus and reducing wear to a minimum.

The invention is illustrated in the accompanying drawings in which:

Figure 1 is a vertical sectional view;

Figure 2 is a sectional plan view on the line II—II of Figure 1.

The apparatus illustrated in Figures 1 and 2 comprises a stationary casing generally indicated at 27, the casing being mounted on supports 28. The casing has a base 29, a cylindrical outer wall 30 extending upwardly from the base, and a conical upper part 31 extending from the upper edge of the wall 30 to a centrally disposed feed tube 32 to which the material to be classified is supplied from hopper 10. The feed tube 32 projects into the upper part of the casing 27, the lower end of the tube being formed with a flared portion 33. The casing also includes an annular wall 34 projecting upwardly from the base 29 and arranged inwardly of the wall 30, the two walls 30 and 34 acting to provide an annular tray in the lower part of the casing.

At a distance below the flared part 33 of the feed tube 32, the casing 27 contains a rotatable disc 35 secured to the upper end of a centrally and vertically disposed shaft 36 which passes through and is supported for rotation on the base 29 of the casing 27, this shaft being adapted to be driven from a suitable source of power.

The disc 35 is of approximately the same diameter as the major diameter of the flared part 33 of the feed tube 32 and as the disc is arranged at a distance below the flared part, there is formed between the part 33 and the disc an annular opening 37 which allows the material supplied to the disc through the feed tube 32, to spill over the peripheral edge of the disc so that the material is formed into a descending curtain while the disc rotates. To promote movement of the material towards the edge of the disc 35, the upper surface of the latter may be of shallow conical form as shown in Figure 1. Other means may be employed to promote movement of the material towards the peripheral edge of the disc 35. A stationary scraper or scrapers may be provided in the locality of the upper edge of the screen 48 to prevent the material from accumulating around this edge.

The tray at the bottom of the casing 27 accommodates three annular partitions 38, 39 and 40. The partition 38 is arranged close to but with a working clearance from the cylindrical wall 30 of the casing, the partition 39 is arranged close to but with a working clearance from the wall 34 of the casing, while the partition 40 is arranged intermediate the partitions 38 and 39. The three partitions act together to provide two annular compartments, one outside the other, the outer compartment being indicated at 41 and the inner compartment at 42. The partition 38 is joined to the partition 40 through the medium of a series of radially disposed blades 43, while the partition 39 is joined to the partition 40 through the medium of a further series of radially disposed sweep blades 44. The compartment 41 is provided with a discharge outlet in the form of a tubular chute 45 secured to the base 29 of the container 27 and opening into this compartment, while the compartment 42 has a discharge outlet in the form of a tubular chute 46 also secured to the base 29 and opening into the compartment 42.

Within the casing 27 there is provided a closed truncated conical wall 47 the lower end of which is joined to the upper edge of the partition 39 while the upper end of the wall is joined to the undersurface of the disc 35 at a position situated inwardly of the peripheral edge of the latter.

Also within the casing 27 there is provided a screen 48 of truncated conical form, the lower edge of the screen, that is to say, the end of greatest diameter, being joined to the upper edge of the partition 40, while the upper edge, that is to say, the end of smallest diameter is joined to the peripheral edge portion of the disc 35. With this arrangement, the annular opening 37 between the flared part 33 of the feed tube 32 and the disc 35 is in communication with the space around the outside inclined surface of the screen 48.

It will be seen that rotation of the shaft 36, will cause corresponding rotation of the disc 35, wall 47, partition 39, blades 44, screen 48, partition 40, blades 43 and partition 38. To lend strength to the rotatable assembly, diagonal stays 49 may be anchored to the shaft 36 and to the wall 47.

The manner in which the apparatus according to Figures 1 and 2 operates will be apparent from the preceding description. When the rotary parts within the casing 27 are put in motion and the material to be classified is supplied to the upper surface of the disc 35 through the feed tube 32 the material will move towards the peripheral edge of the disc and pass through the annular opening 37 from which it will descend as a curtain onto the outer sloping surface of the screen 48. As the material rolls down this surface the fines will pass through the interstices of the screen and fall directly into the annular compartment 42 or be guided into this compartment by the conical wall 47. The coarse pieces will continue to roll down the outer surface of the screen 48 until they fall into the annular compartment 41. As rotation continues, the blades 44 will act to sweep the fines along the compartment 42 until they reach the discharge chute 46 into which they will fall for subsequent collection. Similarly, the blades 43 will act to sweep the coarse pieces into the discharge chute 45 for separate collection. The apparatus thus provides for classification of the starting material into two grades, one fine and the other coarse.

In Figure 1 the apparatus is shown to include means to prevent the screen 48 from becoming clogged while the apparatus is in use. To this end there is provided a brush 51 secured in the space between the conical part 31 of the casing 27 and the screen 48 by means of a bracket 52 fastened to the flared part 33 of the feed tube 32 and by means of a further bracket 53 secured to the conical part 31 of the casing, the bristles of the brush, which may be of wire, bearing on the outer sloping surface of the screen. The pressure exerted on the screen by the bristles of the brush 51 should be so regulated that the bristles merely serve to prevent accumulation of material on the screen and do not tend to force the material through the screen, as such a tendency may result in the interstices of the screen becoming clogged due to the jamming of particles in the interstices. To ensure this desirable effect, the brush may depend from hinges and may carry an adjustable counter-weight so that the pressure exerted by the bristles on the screen can be regulated to a nicety. To further ensure the desirable effect to which reference has been made, the brush 51 may be arranged tangentially to the direction of rotation of the screen so that its inclination is in the direction of rotation of the screen, the upper end of the brush thus becoming the leading end and the lower end of the brush its trailing end.

It will be understood that the apparatus may include a plurality of brushes like the brush 51 of Figure 1.

In Figures 1 and 2 the base 29 of the casing is shown to be formed with a plurality of openings 60 arranged around the shaft 36, these openings permitting escape from the centre part of the casing of any dust that may find its way into this part from the clearance between the wall 34 and partition 39.

In Figures 5 and 6 the construction is such that the working clearance between the base 29 of the casing 27 and the rotatable parts connected to the shaft 36 is constant, this being due to the fact that the shaft 36 is provided with a collar 61 running on the upper surface of the base 29 of the casing.

The apparatus of the present invention may be used in combination with the apparatus forming the subject of my Patent No. 2,697,517. Thus, the starting material may first be treated in the apparatus of the co-pending application and a selected one of the grades so obtained then used as starting material for treatment in the apparatus of the present invention, or vice versa.

What I do claim and desire to obtain by Letters Patent of the United States of America is:

Apparatus for use in classifying loose, unequally divided material into grades, comprising a disc and a shaft supporting said disc for rotation about a vertical axis, a frusto-conical screen coaxially connected to and having its upper peripheral edge secured around the periphery of said disc, said screen diverging downwardly from said disc, an imperforate truncated conical wall having its upper peripheral edge secured to said disc, said conical wall being in spaced downwardly diverging relation beneath said screen, first and second concentric annular partitions secured to and depending to a common horizontal plane from the lower peripheral edges respectively of said screen and said wall, a third annular partition spaced radially outwardly from and concentrically to the partition depending from said screen with its lower edge in said common horizontal plane, said partitions defining concentric annular compartments, one disposed beneath and the other exteriorly of the periphery of said screen, radial sweep blades interconnecting relatively adjacent pairs of said partitions across their respective compartments, said blades terminating at their lower ends on said horizontal plane, a horizontal tray beneath the respective compartments forming the bottoms of the respective compartments and having discharge ports communicating with the respective compartments and means for feeding material to be classified onto said disc compartments.

References Cited in the file of this patent

UNITED STATES PATENTS

| | | |
|---|---|---|
| 133,509 | Welch | Nov. 26, 1872 |
| 236,844 | Russell | Jan. 18, 1881 |
| 456,584 | Morse | July 28, 1891 |
| 456,585 | Morse | July 28, 1891 |
| 657,933 | Goth | Sept. 18, 1900 |
| 931,280 | Cunningham | Aug. 17, 1909 |
| 1,888,636 | O'Toole | Nov. 22, 1932 |

FOREIGN PATENTS

| | | |
|---|---|---|
| 3,375 | Great Britain | Feb. 20, 1892 |